US009571876B2

(12) United States Patent
Hao et al.

(10) Patent No.: US 9,571,876 B2
(45) Date of Patent: Feb. 14, 2017

(54) VIRTUAL SET-TOP BOX DEVICE METHODS AND SYSTEMS

(71) Applicant: Verizon Patent and Licensing Inc., Arlington, VA (US)

(72) Inventors: Jianxiu Hao, Acton, MA (US); Shailan Lala, Braintree, MA (US); Pramod Kalyanasundaram, Acton, MA (US); Michael R. Oliver, Hoboken, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/692,663

(22) Filed: Apr. 21, 2015

(65) Prior Publication Data

US 2016/0316248 A1   Oct. 27, 2016

(51) Int. Cl.
*H04N 21/266* (2011.01)
*H04N 21/414* (2011.01)
*H04N 21/422* (2011.01)

(52) U.S. Cl.
CPC .. *H04N 21/41407* (2013.01); *H04N 21/26613* (2013.01); *H04N 21/42204* (2013.01)

(58) Field of Classification Search
CPC ................... H04N 21/41407; H04N 21/42204; H04N 21/26613
See application file for complete search history.

(56) References Cited

U.S. PATENT DOCUMENTS

| | | | |
|---|---|---|---|
| 2006/0020960 A1* | 1/2006 | Relan | H04N 21/25875 725/30 |
| 2007/0055982 A1* | 3/2007 | Spilo | H04N 21/4334 725/31 |
| 2008/0263235 A1* | 10/2008 | Hans | H04N 21/41407 710/22 |
| 2010/0037248 A1* | 2/2010 | Lo | H04N 21/25435 725/1 |
| 2010/0077488 A1* | 3/2010 | Fujiwara | H04N 21/4524 726/30 |
| 2010/0138884 A1* | 6/2010 | Lau | H04N 21/26606 725/104 |
| 2011/0004893 A1* | 1/2011 | Borislow | H04N 21/42202 725/25 |
| 2011/0145581 A1* | 6/2011 | Malhotra | H04N 21/43615 713/171 |

(Continued)

*Primary Examiner* — Randy Flynn

(57) ABSTRACT

An exemplary method includes virtual set-top box ("STB") device system receiving a registration request to register a mobile computing device to operate as a virtual STB device, verifying that the mobile computing device is within a predefined vicinity of a dedicated STB device that is located at a user premises, providing, to the mobile computing device, a virtual STB key for use by the mobile computing device to operate as the virtual STB device by leveraging access rights of an end-user account of a media content distribution service to access the media content distributed by way of the media content distribution service, and facilitating sharing of the virtual STB key with a media content processing device for use by the media content processing device to access the media content distributed by way of the media content distribution service. Corresponding systems and methods are also described.

18 Claims, 14 Drawing Sheets

(56) References Cited

U.S. PATENT DOCUMENTS

| | | | | |
|---|---|---|---|---|
| 2011/0179497 A1* | 7/2011 | Ayaki | ............... | H04N 21/43615 726/26 |
| 2012/0114121 A1* | 5/2012 | Jung | ................ | H04N 21/26613 380/242 |
| 2013/0145406 A1* | 6/2013 | Baskaran | ........... | H04N 21/2396 725/87 |

* cited by examiner

VIRTUAL SET-TOP BOX DEVICE METHODS AND SYSTEMS

BACKGROUND INFORMATION

The advent of set-top box devices has provided users of media services with access to a large number and variety of media content choices. For example, a user of a media service may choose to access and experience a variety of media content and specific services such as broadcast television programs, pay-per-view services, video-on-demand programming, Internet services, and audio programming by way of a set-top box device.

A provider of such a media service ("service provider") typically obtains media content from one or more content providers and makes the media content accessible to users of the media service, such as by distributing the media content to set-top box devices operated by the users of the media service. The service provider has a vested interest in maximizing competitive advantage and user satisfaction with the media service, such as by providing robust features for use by users of the media service to conveniently access media content. Certain content providers, on the other hand, have a vested interest in controlling (e.g., restricting) how the media content is distributed so as to prevent piracy, protect the value of the media content, and maximize revenue. In view of these interests, content providers often restrict how the service provider distributes the media content. For example, certain content providers require that the service provider restrict the accessibility of media content provided by the content providers by limiting access to the media content to only certain locations such as the homes of the users where dedicated set-top box devices are located. Consequently, users of the media service are unable to access certain media content through the media service when the users are at other locations away from dedicated set-top box devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
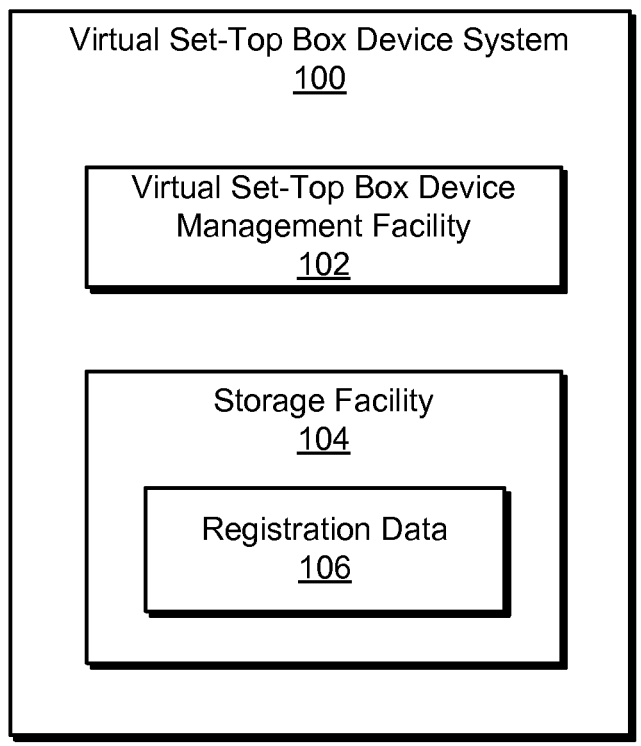
FIG. 1 illustrates an exemplary virtual set-top box device system according to principles described herein.

Exemplary virtual set-top box device methods and systems are disclosed. The systems and methods described herein may configure a mobile computing device to operate as a virtual set-top box ("STB") device. To that end, the systems and methods may receive a registration request from the mobile computing device, verify that the mobile computing device is within a predefined vicinity of a dedicated STB device, provide a virtual STB key to the mobile computing device, and facilitate sharing of the virtual STB key with one or more media content processing devices. For example, a virtual STB device system may receive a registration request to register a mobile computing device to operate as a virtual STB device. After the virtual STB device system receives the registration request, the virtual STB device system may verify that the mobile computing device is within a predefined vicinity of a dedicated STB device that is located at a user premises. After the virtual STB device system verifies that the mobile computing device is within the predefined vicinity, the virtual STB device system may provide the mobile computing device with a virtual STB key for use by the mobile computing device to operate as the virtual STB device. While the virtual STB key is active, the mobile computing device may use the virtual STB key to access media content distributed by way of a media content distribution service. Additionally or alternatively, the virtual STB device system may facilitate sharing of the virtual STB key with a media content processing device that is within a predefined vicinity of the mobile computing device for use by the media content processing device to access, while the virtual STB key is active, the media content distributed by way of the media content distribution service.

To illustrate an example, the virtual STB device system may receive a registration request from a mobile computing device (e.g., a smart phone, a tablet computer, etc.) to operate as a virtual STB device. In certain examples, the virtual STB device system may verify that the mobile computing device is within a predetermined vicinity of a dedicated STB device by verifying that the mobile computing device and the dedicated STB device are connected to a first local area network located at a first user premises. The virtual STB device system may then provide the mobile computing device with a virtual STB key that may be used by the mobile computing device to operate as a virtual STB device. While both the mobile computing device and a media content processing device (e.g., a gaming system, a tablet computer, a smart phone, etc.) are connected to a second local area network located at a second user premises, the virtual STB device system may facilitate sharing the virtual STB key with the media content processing device for use by the media content processing device to access media content. For example, the virtual STB device system may direct the mobile computing device to provide a copy of the virtual STB key to the media content processing device. Using the virtual STB key, the media content processing device may access media content while the media content processing device is connected to the second local area network located at the second user premises and while the virtual STB key is active.

Various benefits may be realized in accordance with the systems and methods described herein. For example, exemplary systems and methods described herein may enable a user of a media content distribution service to access media content by way of a virtual STB device at a location other than where a dedicated STB device is located. In addition, through a virtual STB device, certain systems and methods described herein may effectively allow the user to share media content with others (e.g., with friends and/or family of the user) at any location. These and/or additional or alternative benefits that may be provided by exemplary systems and methods described herein will be made apparent by the following description. Exemplary virtual STB device methods and systems will now be described in reference to the accompanying drawings.

FIG. 1 illustrates an exemplary virtual STB device system 100 ("system 100"). System 100 may perform one or more of the operations described herein to configure a mobile computing device to operate as a virtual STB device. As shown in FIG. 1, system 100 may include, without limitation, a virtual STB device management facility 102 ("management facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, the facilities 102 and 104 may be combined into a single facility or split into additional facilities as may serve a particular implementation. Additionally or alternatively, one or more of the facilities 102 and 104 may be omitted from and external to system 100 in other implementations. For example, storage facility 104 may be external of system 100 in some alternative implementations. Facilities 102 and 104 will now be described in more detail.

Storage facility 104 may be configured to store registration data 106 representative of information associated with registration of one or more mobile computing devices to operate as one or more virtual STB devices and that may be used by system 100 to monitor registrations of the one or more mobile computing devices. For example, registration data 106 may include device data, connection status data, virtual STB key data, virtual STB key expiration data, and/or any other suitable information associated with registration and/or operation of one or more mobile computing devices as one or more virtual STB devices.

Management facility 102 may perform one or more operations associated with configuring a mobile computing device to operate as a virtual STB device. In certain examples, such operations may include management facility 102 receiving a registration request to register a mobile computing device to operate as a virtual STB device. Management facility 102 may receive the registration request in any suitable manner. For example, management facility 102 may receive a registration request transmitted from the mobile computing device by way of a local area network at a user premises. Specific examples of registration requests and how they may be received by management facility 102 are described herein.

After management facility 102 receives the registration request, management facility 102 may verify that the mobile computing device is within a predefined vicinity of a dedicated STB device. The predefined vicinity of the dedicated STB device may include any suitable area and may be defined in any suitable manner. For example, the predefined vicinity may include an area defined by a circle having a radius that is a predetermined distance from the dedicated STB device. Additionally or alternatively, the predefined vicinity may include a wireless range of a local area network to which the dedicated STB device is connected. That is, the predefined vicinity may be defined by a maximum range at which a mobile computing device may be located from the dedicated STB device and still wirelessly communicate with the dedicated STB device by way of the local area network. The predefined vicinity may be defined in any other manner as may serve a particular implementation.

Management facility 102 may verify that the mobile computing device is within the predefined vicinity of a dedicated STB device in any suitable manner. For example, management facility 102 may determine that the mobile computing device is within the predefined vicinity based on the mobile computing device being communicatively connected to the dedicated STB device by way of a local area network at a user premises (e.g., a home of a user). By verifying that the mobile computing device is within the predefined vicinity of the dedicated STB device before providing a virtual STB key to the mobile computing device, management facility 102 may control how the mobile computing device can register to operate as a virtual STB device. Such control may require that the mobile computing device register and/or periodically re-register when located within the predefined vicinity of the dedicated STB device. This level of control may satisfy the interests of media content providers such that the media content providers may agree to allow media content provided by the media content providers to be accessible by way of a virtual STB device in a media content distribution service.

After management facility 102 verifies that the mobile computing device is within a predefined vicinity of a dedicated STB device, management facility 102 may provide a virtual STB key for use by the mobile computing device to operate as a virtual STB device. The virtual STB key may have any suitable form, and management facility 102 may provide the virtual STB key to the mobile computing device in any suitable manner. For example, management facility 102 may direct the dedicated STB device to provide the virtual STB key to the mobile computing device by way of the local area network at the user premises. Alternatively, management facility 102 may direct a service provider system (e.g., a server system operated by the service provider) to provide the virtual STB key to the mobile computing device. Specific examples of how the virtual STB key may be provided to the mobile computing device are provided herein.

In certain examples, the virtual STB key may be active for only a predetermined amount of time. The predetermined amount of time may include any suitable length of time (e.g., one day, one week, one month, one year, etc.), and may be defined in any suitable manner. While the virtual STB key is active, the mobile computing device may use the virtual STB key to operate as a virtual STB device. After expiration of the predetermined amount of time, the virtual STB key may become inactive (i.e., expire) such that the mobile computing device may no longer use the virtual STB key to operate as a virtual STB device.

While the virtual STB key is active, the mobile computing device may operate as a virtual STB device by leveraging access rights of an end-user account of a media content distribution service to access media content that is distributed by way of the media content distribution service and that is accessible through the access rights of the end-user account. Specific examples of how a mobile computing device may, while operating as a virtual STB device, leverage access rights of an end-user account of a media content distribution service are provided herein.

A provider of a media content distribution service may operate a service provider system that distributes media content, as part of the service, for access by end users of the service. The service provider system may control access to the media content. For an appropriately registered end user, for example, the service provider system may maintain an end-user account that specifies access rights for the user. The access rights may indicate what media content (e.g., media content included in a service subscription package) and/or how the media content may be accessed by the user. For example, based on the access rights, the service provider system may allow the user to access certain media content through one or more dedicated STB devices that are associated with the end-user account and located at a user premises and/or may allow the user to access certain media content through one or more other media content processing devices when the user provides appropriate authentication information (e.g., a username and password for the user) to the service provider system.

Figure 2:
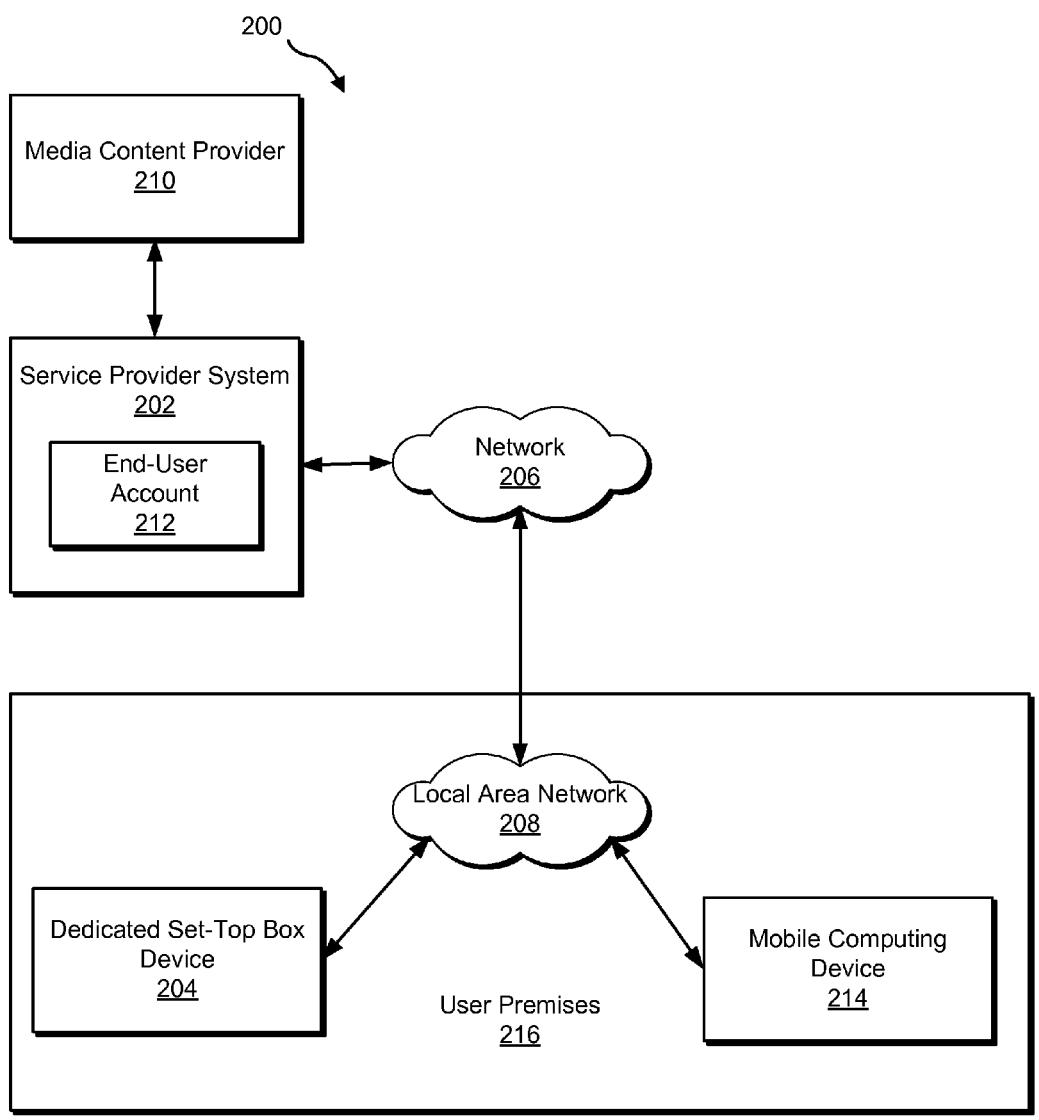
FIG. 2 illustrates an exemplary implementation of the virtual set-top box device system of FIG. 1 according to principles described herein.

To illustrate, FIG. 2 shows an exemplary implementation 200 in which system 100 may be incorporated and that includes a service provider system 202 that is communicatively coupled to a dedicated STB device 204 by way of a network 206 and a local area network 208. While FIG. 2 shows a particular number and arrangement of devices, in practice, implementation 200 may include additional, fewer, different, or differently arranged devices than are shown in FIG. 2.

Service provider system 202 may be configured to provide one or more media content services (e.g., television services, video-on-demand services, Internet services, application services, etc.) to dedicated STB device 204. For example, service provider system 202 may be configured to manage (e.g., maintain, process, and/or generate) media content (e.g., media content programs, advertisements, etc.) and to distribute media content for access by dedicated STB device 204.

Figure 3:
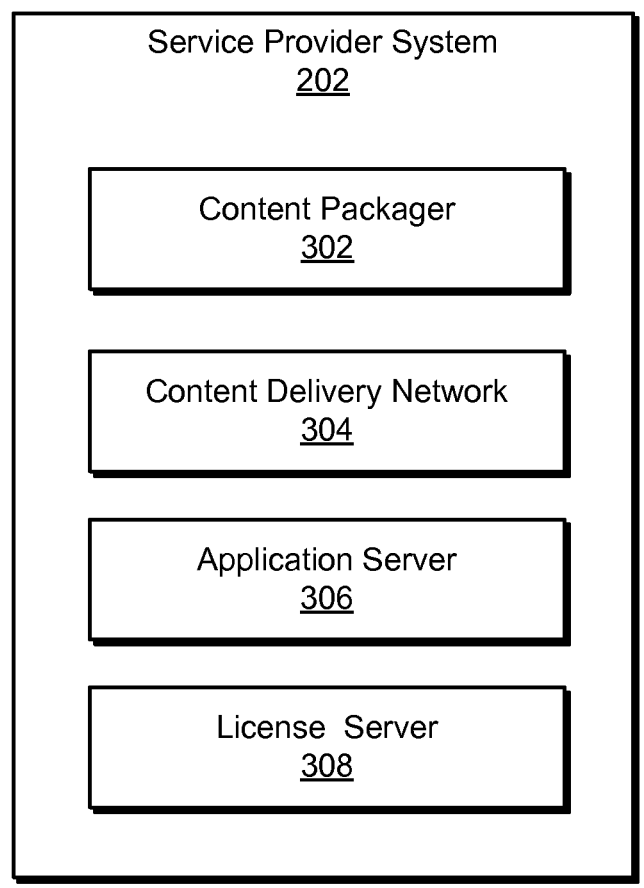
FIG. 3 illustrates an exemplary service provider system according to principles described herein.

In certain examples, service provider system 202 may comprise multiple devices that work together to provide media content and/or specific services as part of a media content distribution service. For example, as shown in FIG. 3, service provider system 202 may include a content packager 302, a content delivery network 304, an application server 306, and a license server 308. Content packager 302, content delivery network 304, application server 306, and license server 308 may operate in concert to provide media content through the media content distribution service. While FIG. 3 shows a particular number of components of service provider system 202, in other examples service provider system 202 may include additional, fewer, or different devices than are shown in FIG. 3. For example, each of content packager 302, content delivery network 304, application server 306, and license server 308 may be implemented as multiple, possibly distributed, components. Alternatively, two or more of content packager 302, content delivery network 304, application server 306, and license server 308 may be implemented within a single component.

Content packager 302 may receive media content from a media content provider, such as media content provider 210 shown in FIG. 2. Content packager 302 may include a computing device that processes media content and/or a storage device, such as a database, that stores or processes video content. Content packager 302 may process media content received from a media content provider, such as by performing encoding operations on the media content using, for example, public/private keys. Content packager 302 may store media content in encrypted form. Content packager 302 may also process the media content by performing transcoding operations on the media content to transcode content into different formats for playback by different media content processing devices. After content packager 302 processes the media content, content packager 302 may send the media content to content delivery network 304 for storage. Content packager 302 may also provide content protection keys (e.g., encryption keys) to license server 308.

Content delivery network 304 may include one or more computing devices that deliver media content over network 206, such as to dedicated STB device 204. For example, content delivery network 304 may stream or download media content to dedicated STB device 204. In certain implementations, content delivery network 304 may comprise a plurality of remote cloud content delivery networks.

Application server 306 may include a backend support system that can support user authentication as well as search and browse features of media content. Application server 306 may include a server computing device that provides a media content application and/or performs user authentication, content listing management, and/or order processing. For example, application server 306 may provide (e.g., download) a media content application to dedicated STB device 204, which media content application may permit a user of dedicated STB device 204 to find media content of interest to access and consume. Additionally or alternatively, application server 306 may provide media content metadata, such as lists or categories of media content. In certain implementations, the interactions between application server 306 and dedicated STB device 204 may be performed using Hypertext Transfer Protocol ("HTTP") or Hypertext Transfer Protocol Secure ("HTTPS"). Alternatively, the interactions between application server 306 and dedicated STB device 204 may be performed using another type of data communications protocol.

License server 308 may validate, enforce, and issue Digital Rights Management ("DRM") licenses. License server 308 may include a server computing device that provides key and license management. For example, license server 308 may receive, in any suitable manner, a request from dedicated STB device 204 for a license relating to requested media content to be streamed or downloaded. The license may include information regarding the type of use permitted according to the access rights of an end user account maintained by service provider system 202 and a decryption key that permits dedicated STB device 204 to decrypt the media content. Based on the license, dedicated STB device 204 may access, in any suitable manner, the media content from content delivery network 304.

In certain implementations, license server 308 may maintain a database of active STB keys and/or active virtual STB keys that may be used to authenticate a device requesting access to media content. When license server 308 receives a request from a device to access media content, license server 308 may perform an operation to validate an STB key or a virtual STB key included in the request. For example, license server 308 may compare the STB key or the virtual STB key included in the request with the active STB keys and/or active virtual STB keys stored in the database. If the STB key or the virtual STB key included in the request matches one of the active STB keys or one of the active virtual STB keys stored in the database, license server 308 may provide a license to the device to access the media content.

In some implementations, the communication between license server 308 and dedicated STB device 204 may be conducted over a secure channel, may include public and private keys, and/or may include other forms of secure communication.

In the example shown in FIG. 2 and as mentioned above, service provider system 202 may receive media content from media content provider 210. Media content provider 210 may be any system and/or entity (e.g., a content producer such as ESPN, NBC, etc.) that may generate or otherwise provide media content. Although only one media content provider 210 is illustrated in FIG. 2, it is understood that service provider system 202 may receive media content from a plurality of different media content providers in certain implementations.

As used herein, the term "media content" may refer to a television program, on-demand media program, pay-per-view media program, broadcast media program (e.g., broadcast television program), multicast media program (e.g., multicast television program), narrowcast media program (e.g., narrowcast video-on-demand program), Internet Protocol television ("IPTV") media program, advertisement, video, movie, audio program, radio program, and/or any other media content that may be distributed by service provider system 202 as part of the media content distribution service.

Media content distributed by service provider system 202 may be selectively made accessible to an end user of the media content distribution service in accordance with access rights of an end-user account 212 maintained by service provider system 202 for the end user. In the example shown in FIG. 2, end-user account 212 is linked to and defines access rights associated with dedicated STB device 204. Although FIG. 2 illustrates only one end-user account 212, it is understood that service provider system 202 may maintain a plurality of end-user accounts associated with different users registered with the media content distribution service.

End-user account 212 may represent a single end-user account registered with the media content distribution service (e.g., a household account with the media content distribution service). For example, end-user account 212 may be a single customer account with the media content distribution service (e.g., a subscription account for a subscriber to the media content distribution service). End-user account 212 may specify features, media programs distributed by way of the media content distribution service, and/or information about the media programs distributed by way of the media content distribution service that the end user and/or the dedicated STB device 204 associated with the end-user account 212 is entitled to access. For example, end-user account 212 may be a television service subscription account that specifies a package of television channels that the end user and/or the dedicated STB device 204 is entitled to access as part of the subscription. Based on access rights specified by end-user account 212, dedicated STB device 204 may be granted access to certain channels and/or media programs associated with the channels at no additional charge (e.g., no purchase or rental fee on top of a subscription fee). Based on access rights specified by end-user account 212, dedicated STB device 204 may be granted access to certain other channels and/or media programs associated with the other channels only if an additional charge (e.g., an increased subscription fee, a transactional purchase or rental fee, etc. on top of the subscription fee) is paid.

As used herein, the term "dedicated STB device" may refer to any device that is dedicated to function primarily as an STB device to access media content and/or media services provided by a specific media content service provider and/or provided to an end user of a media content distribution service by the media content service provider. In certain examples, dedicated STB device 204 may be specifically provided by a service provider to an end user of the media content distribution service for use by the end user to access media content through the media content distribution service. Dedicated STB device 204 may include any suitable device that is dedicated to function primarily as an STB device. In certain examples, dedicated STB device 204 may include a device having digital video recording ("DVR") capabilities.

As shown in FIG. 2, dedicated STB device 204 may be communicatively coupled to a mobile computing device 214 by way of local area network 208 at a user premises 216. Mobile computing device 214 may include, but is not limited to, a tablet computer, a laptop computer, a smartphone device, or any other suitable mobile device. In certain examples, mobile computing device 214 may be directly associated with (e.g., owned or operated by) the user represented by end-user account 212. Through mobile computing device 214, the user represented by end-user account 212 may leverage the access rights of end-user account 212 to access media content. Prior to mobile computing device 214 accessing the media content, mobile computing device 214 may go through an authentication process in which mobile computing device 214 is authenticated with service provider system 202. The authentication process may include, for example, mobile computing device 214 providing (e.g., in response to user input) user login credentials to application server 306. Additionally or alternatively, the authentication process may include a verification that mobile computing device 214 is within a predefined vicinity of dedicated STB device 204. Once authenticated, the user represented by end-user account 212 may leverage the access rights of end-user account 212 to access media content through mobile computing device 214.

Management facility 102 and storage facility 104 may each be implemented by service provider system 202, dedicated STB device 204, mobile computing device 214, or a combination or sub-combination thereof. Accordingly, in certain embodiments, components of system 100 may be implemented entirely by service provider system 202, by dedicated STB device 204, or by mobile computing device 214. In other embodiments, components of system 100 may be distributed across a combination or sub-combination of service provider system 202, dedicated STB device 204, and mobile computing device 214.

Service provider system 202, dedicated set-top box device 204, and mobile computing device 214 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), HTTP, HTTPS, SIP, SCCP, XMPP, Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Long Term Evolution ("LTE") technologies, Multimedia Message Service ("MMS"), radio frequency ("RF") signaling technologies, wireless communication technologies, Internet communication technologies, digital content streaming technologies, digital content download technologies, Bluetooth communications technologies, and other suitable communications technologies.

In certain embodiments, service provider system 202, dedicated STB device 204, and mobile computing device 214 may communicate via network 206 and local area network 208. Network 206 may include one or more networks, such as one or more wireless networks, wireless communication networks, mobile telephone networks (e.g., cellular telephone networks), closed media networks, open media networks, closed communication networks, open communication networks, wide area networks (e.g., the Internet), and any other networks capable of carrying data and/or communications signals between service provider system 202, dedicated STB device 204, and mobile computing device 214. Local area network 208 may include any suitable local area network that may facilitate communication between dedicated STB device 204 and mobile computing device 214. Network 206 and local area network 208 may be communicatively connected in any suitable way, such as by way of a router device located at user premises 216 and connected to both network 206 and local area network 208. Communications between service provider system 202, dedicated STB device 204, and mobile computing device 214 may be transmitted using any one of the above-listed networks, or any combination or sub-combination of the above-listed networks. Alternatively, service provider system 202, dedicated STB device 204, and mobile computing device 214 may communicate in another way such as by direct connections between service provider system 202, dedicated STB device 204, and mobile computing device 214.

Management facility 102 may configure mobile computing device 214 to operate as a virtual STB device. As used herein, the term "virtual STB device" may refer to a mobile computing device that is not a dedicated STB device but that is configured to perform one or more of the operations (e.g., streaming operations, media services operations, etc.) of a dedicated STB device by leveraging the same access rights used by the dedicated STB device to perform the operations. However, unlike a dedicated STB device, operation of a mobile computing device as a virtual STB device may not be tied to a specific location. For example, as described herein, mobile computing device 214 may be configured to operate as a virtual STB device by utilizing a virtual STB key to operate as a virtual STB device at a location other than user premises 216.

Management 102 may configure a mobile computing device to operate as a virtual STB device in any suitable manner. For example, management facility 102 may provide a virtual STB key to mobile computing device 214 for use by the mobile computing device 214 to operate as a virtual STB device. Management facility 102 may also activate the virtual STB key with service provider system 202, such as by providing, in any suitable manner, data identifying mobile computing device 214 and/or the virtual STB key to service provider system 202 (e.g., to application server 306 and/or license server 308). Management facility 102 may provide information about the mobile computing device 214 and/or virtual STB key to service provider system 202, such as information indicating a lifetime that a virtual STB key is to be active. Service provider system 202 may then use such data, in any suitable manner, to authenticate mobile computing device 214 as a virtual STB device allowed to leverage the access rights of end-user account 212 to interact with the media content distribution service (e.g., by processing media content access requests).

In certain examples, management facility 102 may further configure mobile computing device 214 to operate as a virtual STB device by providing a media service client application to mobile computing device 214 for installation and execution by mobile computing device 214. For example, management facility 102 may direct application server 306 to provide a media service client application to mobile computing device 214. When the media service client application is installed and executed by mobile computing device 214, the media service client application may provide one or more graphical user interface views that facilitate a user discovering media content of interest and/or accessing media content while mobile computing device 214 operates as a virtual STB device.

In certain examples, more than one mobile computing device may be configured to operate as a virtual STB device by leveraging access rights associated with an individual end-user account at a given time. For example, management facility 102 may receive a first registration request from a first mobile computing device to operate as a first virtual STB device. In response to the first registration request, and after management facility 102 verifies that the first mobile computing device is within a predefined vicinity of a dedicated STB device, management facility 102 may provide a first virtual STB key to the first mobile computing device. Management facility 102 may also receive a second registration request from a second mobile computing device to operate as a second virtual STB device. In response to the second registration request, and after management facility 102 verifies that the second mobile computing device is within a predefined vicinity of the dedicated STB device, management facility 102 may provide a second virtual STB key to the second mobile computing device. The first mobile computing device and the second mobile computing device may then concurrently operate as virtual STB devices by leveraging access rights associated with the individual end-user account.

Management facility 102 may provide a virtual STB key to a mobile computing device based on various different communication sequences that may occur between, for example, the systems/devices illustrated in FIG. 2. Specific examples of different communication sequences that may facilitate management facility 102 providing a virtual STB key to mobile computing device 214 will now be described with reference to FIGS. 4-7.

Figure 4:
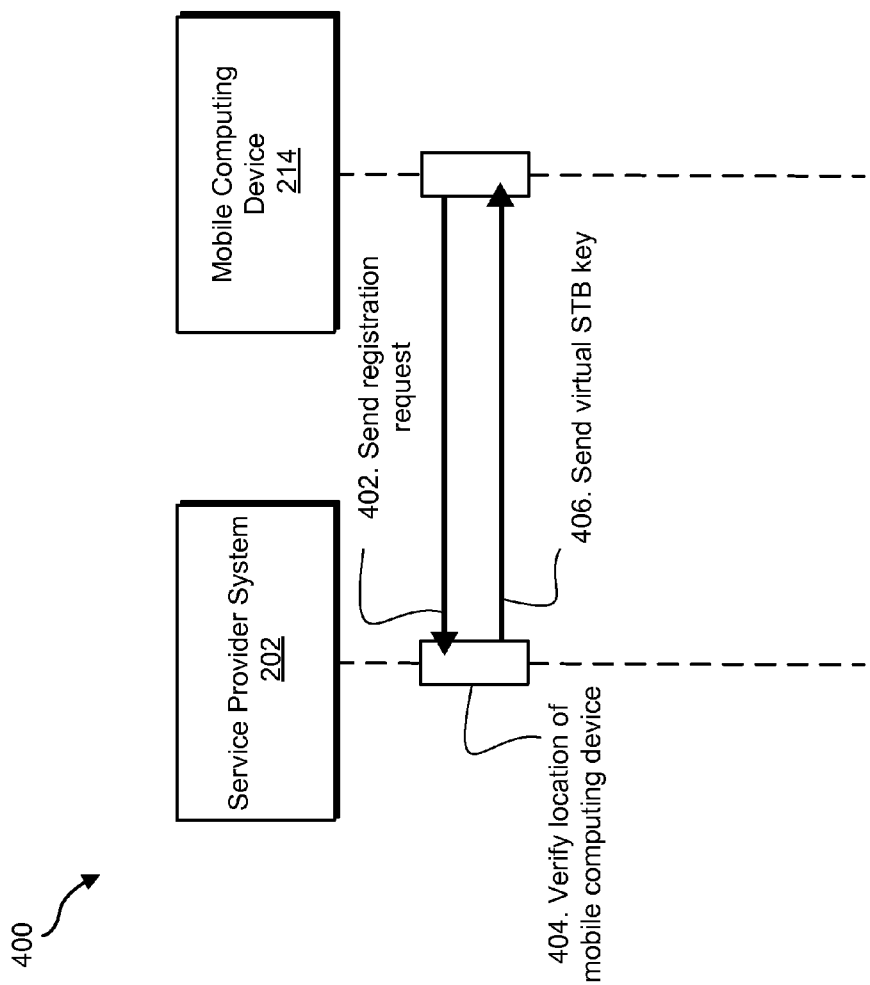
FIGS. 4-7 illustrate exemplary sequence diagrams according to principles described herein.

FIGS. 4-7 illustrate exemplary sequence diagrams that show ways in which various devices/systems illustrated in FIG. 2 may communicate to facilitate management facility 102 providing a virtual STB key to mobile computing device 214. For example, FIG. 4 depicts an exemplary sequence diagram 400 showing how mobile computing device 214 may communicate with service provider system 202 to facilitate management facility 102 providing a virtual STB key to mobile computing device 214. In FIG. 4, arrow 402 represents a registration request sent from mobile computing device 214 to service provider system 202. Box 404 represents service provider system 202 verifying that mobile computing device 214 is within a predefined vicinity of dedicated STB device 204. Arrow 406 represents service provider system 202 sending a virtual STB key to mobile computing device 214 in response to the request and verification.

Figure 5:
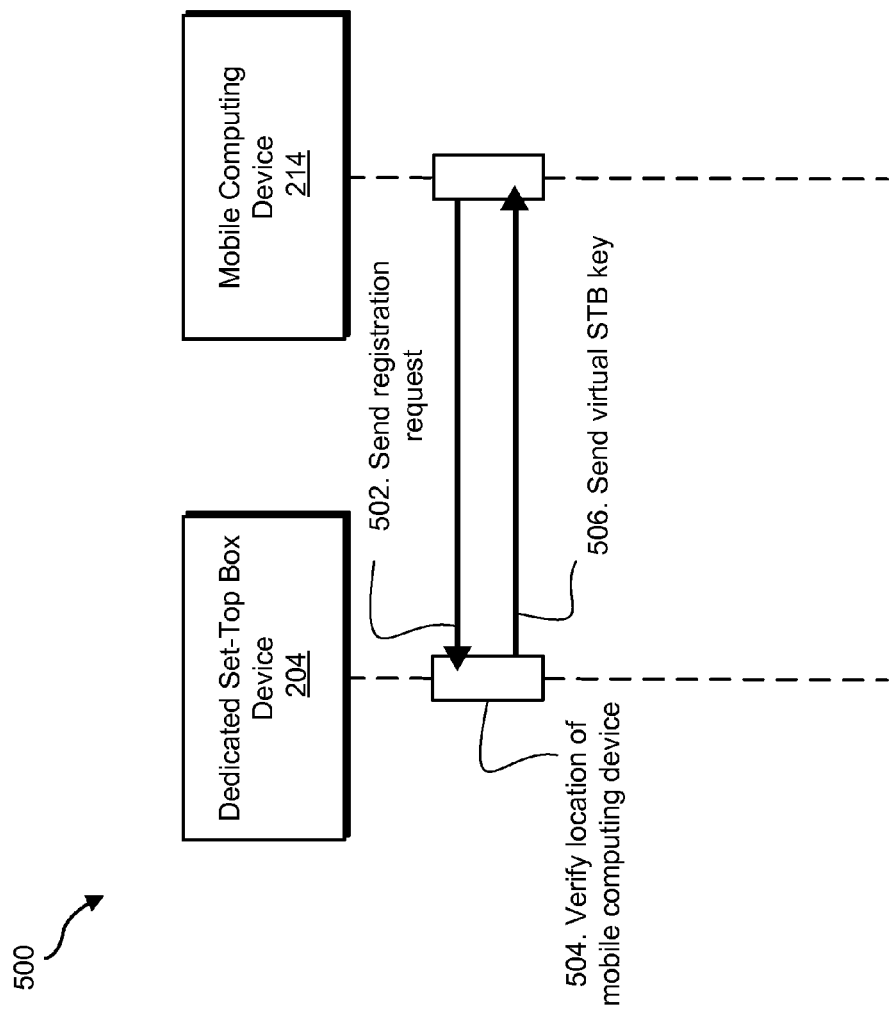

FIG. 5 depicts an exemplary sequence diagram 500 showing how mobile computing device 214 may communicate with dedicated STB device 204 to facilitate management facility 102 providing a virtual STB key to mobile computing device 214. In FIG. 5, arrow 502 represents a registration request sent from mobile computing device 214 to dedicated STB device 204. Box 504 represents dedicated STB device 214 verifying that mobile computing device 214 is within a predefined vicinity of dedicated STB device 204. Arrow 506 represents dedicated STB device 204 sending a virtual STB key to mobile computing device 214 in response to the request and verification.

Figure 6:
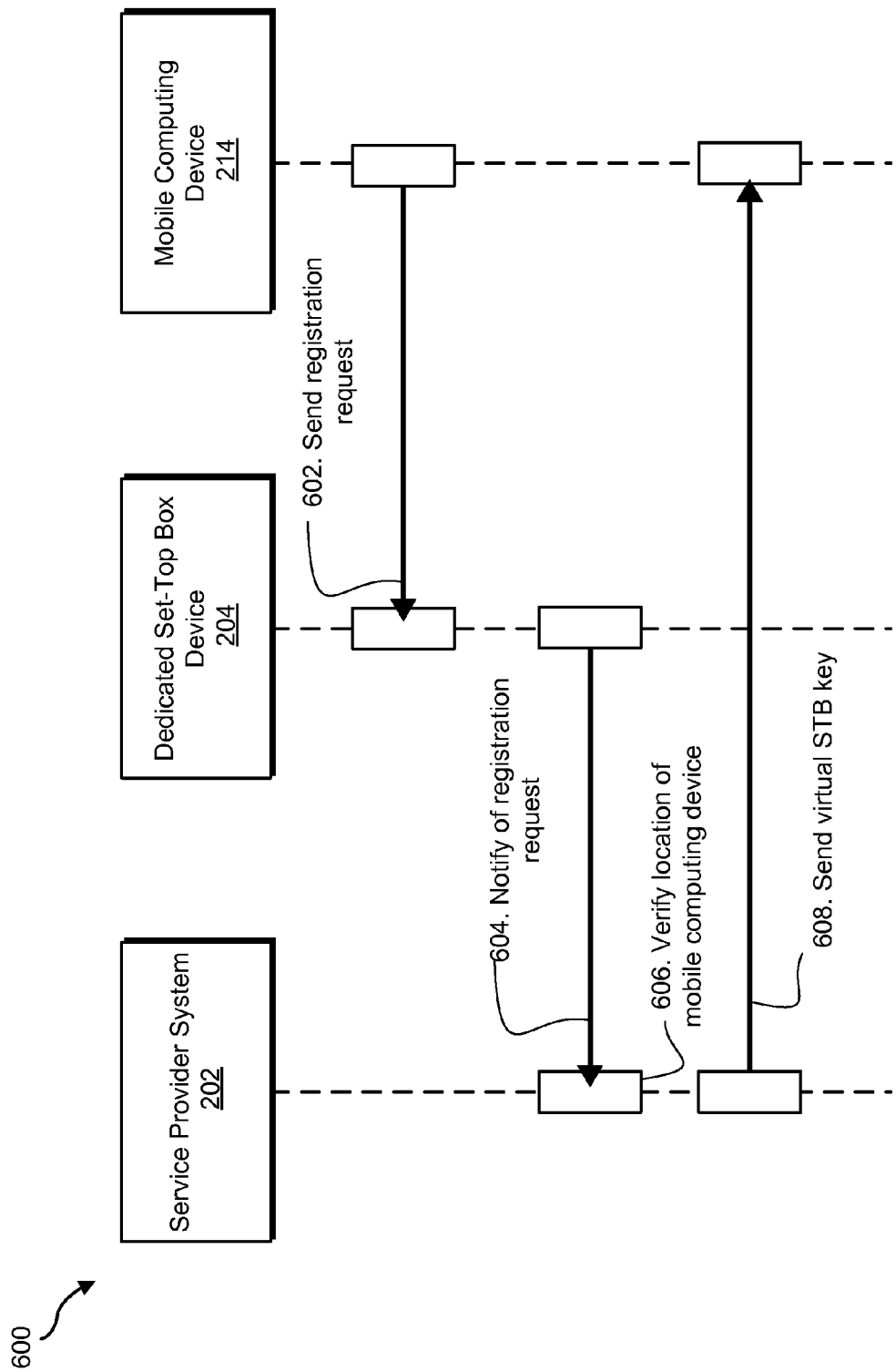

FIG. 6 depicts an exemplary sequence diagram 600 showing how service provider system 202, dedicated STB device 204, and mobile computing device 214 may communicate to facilitate management facility 102 providing the virtual STB key to mobile computing device 214. In FIG. 6, arrow 602 represents a registration request sent from mobile computing device 214 to dedicated STB device 204. Arrow 604 represents a notification from dedicated STB device 204 to service provider system 202 indicating receipt of the registration request. Box 606 represents service provider system 202 verifying that mobile computing device 214 is within a predefined vicinity of dedicated STB device 204. Arrow 608 represents service provider system 202 sending a virtual STB key to mobile computing device 214. Although the exemplary sequence diagram illustrated in FIG. 6 shows service provider system 202 verifying the location of mobile computing device 214, it is understood that service provider system 202 and/or dedicated STB device 204 may perform the verifying depending on the particular implementation. In certain examples, the mobile computing device 214 being within a predefined vicinity of dedicated STB device 204 may be implied from the notice sent from dedicated STB device 204 to service provider system 202 because the notice indicates that dedicated STB device 204 received the registration request from mobile computing device 214.

Figure 7:
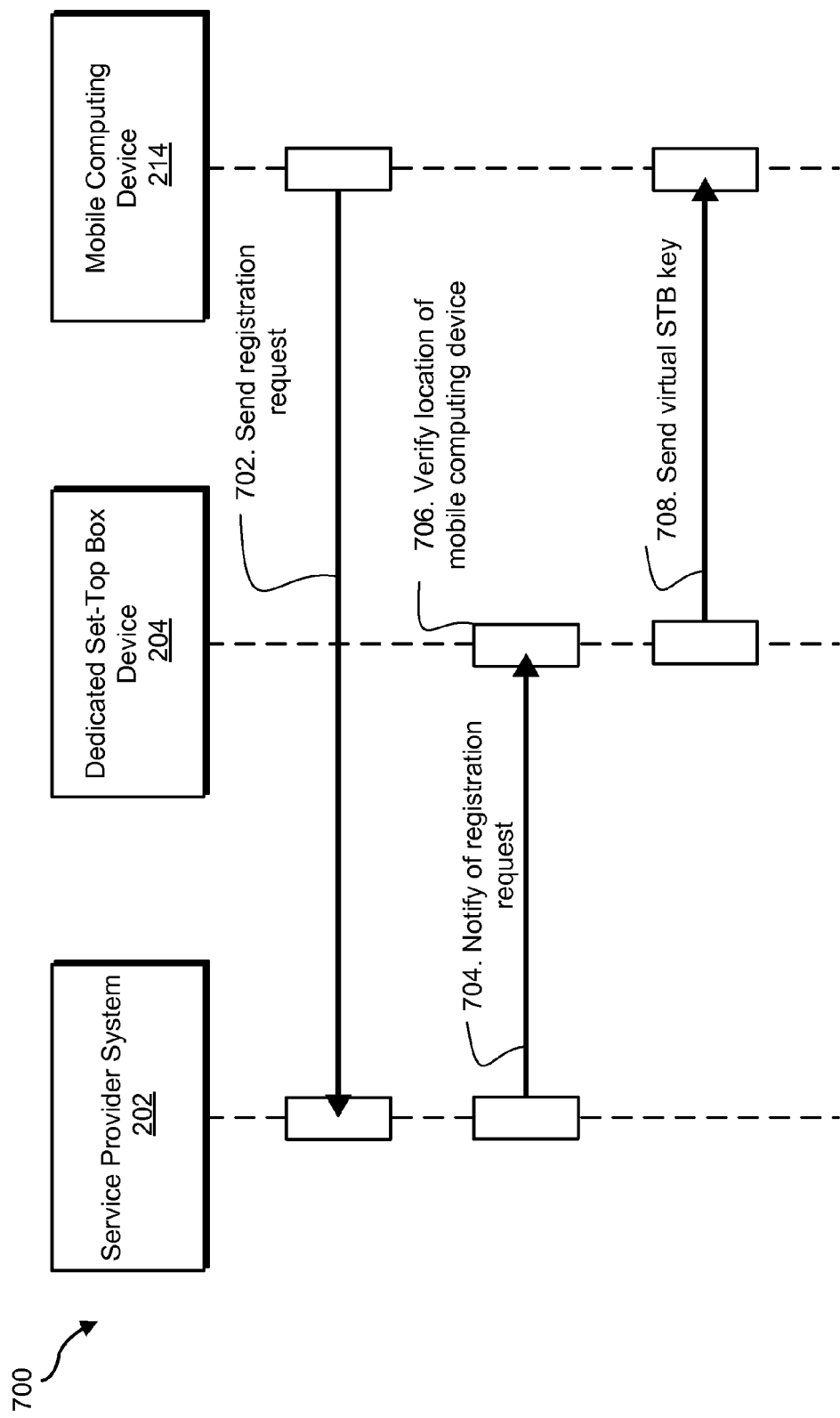

FIG. 7 depicts an additional exemplary sequence diagram 700 showing how service provider system 202, dedicated STB device 204, and mobile computing device 214 may communicate to facilitate management facility 102 providing the virtual STB key to mobile computing device 214. In FIG. 7, arrow 702 represents a registration request sent from mobile computing device 214 to service provider system 202. Arrow 704 represents a notification from service provider system 202 to dedicated STB device 204 indicating receipt of the registration request. Box 706 represents dedicated STB device 204 verifying that mobile computing device 214 is within a predefined vicinity of dedicated STB device 204 (e.g., by verifying that mobile computing device 214 is currently in communication with dedicated STB device 204 by way of local area network 208). Arrow 708 represents dedicated STB device 204 sending a virtual STB key to mobile computing device 214. Although the exemplary sequence diagram illustrated in FIG. 7 shows dedicated STB device 204 verifying the location of mobile computing device 214, it is understood that service provider system 202 and/or dedicated STB device 204 may perform the verifying depending on the particular implementation.

The exemplary sequence diagrams illustrated in FIGS. 4-7 are provided for illustrative purposes only. It is understood that other sequences for receiving a registration request and providing a virtual STB key may be provided in other implementations.

After management facility 102 configures mobile computing device 204 to operate as a virtual STB device by providing an active virtual STB key to mobile computing device 214, management facility 102 may facilitate sharing of the virtual STB key with one or more media content processing devices, that are within a predefined vicinity of mobile computing device 214, for use by the one or more media content processing devices to leverage the access rights of end-user account 212 to access media content by way of the media content distribution service. As used herein, "a media content processing device" may include any device capable of receiving and processing (e.g., presenting) media content distributed by way of a media content distribution service. For example, a media content processing device may include, but is not limited to, a smartphone device, a tablet computer device, a gaming device, a desktop computer, a television, etc.

The predefined vicinity of a mobile computing device may include any suitable area and may be defined in any suitable manner. For example, the predefined vicinity may include an area defined by a circle having a radius that is a predetermined distance from mobile computing device 214. Alternatively, the predefined vicinity may include a wireless range of a local area network in which mobile computing device 214 is located. That is, the predefined vicinity may be defined by a maximum range at which a media content processing device may be located from mobile computing device 214 and still wirelessly communicate with mobile computing device 214 by way of the local area network. The predefined vicinity of the mobile computing device may be defined in any other manner as may serve a particular implementation.

Prior to management facility 102 facilitating sharing of the virtual STB key with a media content processing device, management facility 102 may verify that the media content processing device is within a predefined vicinity of a mobile computing device that is configured to operate as a virtual STB device. Management facility 102 may verify that the media content processing device is within a predefined vicinity of the mobile computing device in any suitable manner. For example, management facility 102 may utilize any suitable global positioning capability of mobile computing device 214 and a media content processing device to determine whether mobile computing device 214 and the media content processing device are within a predefined vicinity of one another. Alternatively, management facility 102 verify that the media content processing device is within a predefined vicinity of mobile computing device 214 based on both the media content processing device and mobile computing device 214 being concurrently connected to the same local area network.

Figure 8:
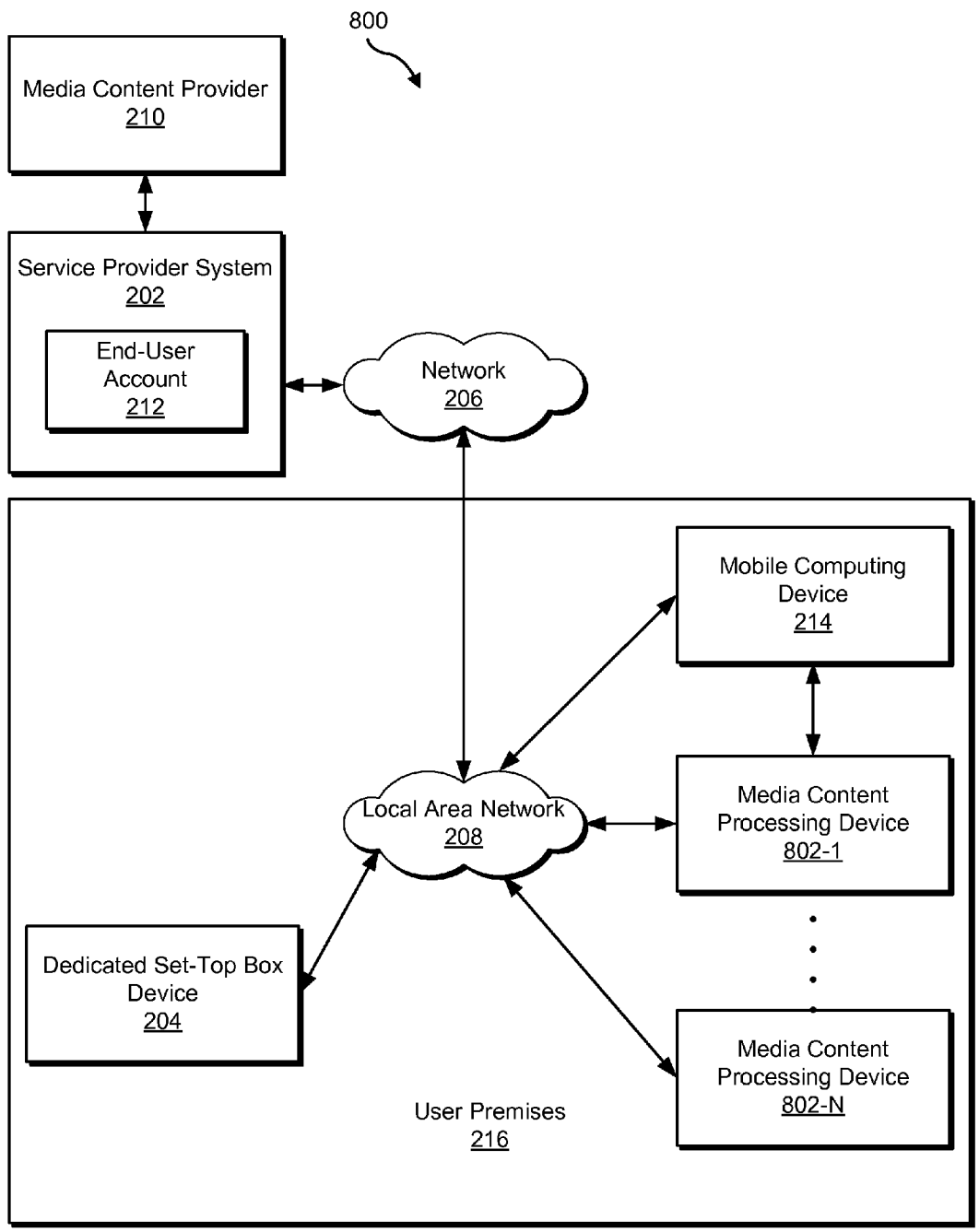
FIGS. 8-9 illustrate additional exemplary implementations of the virtual set-top box device system of FIG. 1 according to principles described herein.

To illustrate, FIG. 8 shows an exemplary implementation 800 that is similar to implementation 200 illustrated in FIG. 2 except that dedicated STB device 204 and mobile computing device 214 are further communicatively coupled to one or more media content processing devices 802 (e.g., media content processing devices 802-1 through 802-N) by way of local area network 208. Management facility 102 may verify, in any suitable manner, that mobile computing device 214 and, for example, media content processing device 802-1 are within a predefined vicinity of each other by virtue of mobile computing device 214 and media content processing device 802-1 each being connected to local area network 208.

In certain examples, management facility 102 may receive an authentication request from a media content processing device to authenticate the media content processing device as being within the predefined vicinity of mobile computing device 214. In response to the authentication request, management facility 102 may verify, in any suitable manner, that the media content processing device is within the predefined vicinity of the mobile computing device. For example, media content processing device 802-1 may send an authentication request to mobile computing device 214 to verify that media content processing device 802-1 is within a predefined vicinity of mobile computing device 214. In certain examples, media content processing device 802-1 may send the authentication request in response to a user attempting to access media content through media content processing device 802-1 while mobile computing device 214 operates as a virtual STB device.

By verifying that a media content processing device is within the predefined vicinity of mobile computing device 214 operating as a virtual STB device before facilitating the sharing of the virtual STB key with the media content processing device, management facility 102 may control how the virtual STB key may be used to access media content. Such control over sharing of the virtual STB key may satisfy the interests of media content providers such that the media content providers may agree to allow media content provided by the media content providers to be accessible by way of a media content processing device that is locally connected to a virtual STB device.

After management facility 102 verifies that a media content processing device is within a predefined vicinity of mobile computing device 214, management facility 102 may facilitate the sharing of the virtual STB key with the media content processing device in any suitable manner. In certain examples, management facility 102 may direct mobile computing device 214 to provide an encrypted copy of the virtual STB key to the media content processing device. Alternatively, management facility 102 may direct dedicated STB device 204 to provide an encrypted copy of the virtual STB key to the media content processing device. In other examples, management facility 102 may direct service provider system 202 to provide an encrypted copy of the virtual STB key to the media content processing device.

Through the virtual STB key, mobile computing device 214 and/or a media content processing device such as media content processing device 802-1 may leverage the access rights of end-user account 212 of a media content distribution service to access media content distributed by way of the media content distribution service. For example, while mobile computing device 214 and media content processing device 802-1 are each connected to local area network 208 (or some other local area network), media content processing device 802-1 may send a request to access media content to service provider system 202. In conjunction with the request, media content processing device 802-1 may send the virtual STB key (e.g., an encrypted virtual STB key that has been shared with media content processing device 802-1) to service provider system 202 (e.g., to license server 308). Service provider system 202 may then verify that the virtual STB key is active and, in response, provide the requested media content to media content processing device 802-1 in any suitable manner.

In certain examples, media content processing device 802-1 may send a request to access media content to mobile computing device 214, which may receive the media content access request by way of a local area network. The media content access request may include the virtual STB key and may specify media content to be accessed by media content processing device 802-1. Mobile computing device 214 may provide, in any suitable manner, the media content access request and the virtual STB key to service provider system 202 (e.g., to license server 308) to verify that the virtual STB key is active. Mobile computing device 214 may receive a verification from service provider system 202 that the virtual STB key is active. After receiving the verification, mobile computing device 214 may facilitate access to the media content by media content processing device 802-1.

Mobile computing device 214 may facilitate access to the requested media content in any suitable manner. In certain examples, mobile computing device 214 may receive the requested media content from service provider system 202 and provide the requested media content, in any suitable manner, to media content processing device 802-1. For example, mobile computing device 214 may stream the media content from service provider system 202 and, in turn, may stream the media content to media content processing device 802-1. Alternatively, media content processing device 802-1 may receive the requested media content, in any suitable manner, directly from service provider system 202 (e.g., from content delivery network 304).

The example illustrated in FIG. 8 shows mobile computing device 214 and media content processing devices 802 located at user premises 216 where dedicated STB device 204 is located. However, in certain examples, mobile computing device 214 may operate as a virtual STB device at a location other than user premises 216. For example, after mobile computing device 214 receives the virtual STB key while located at user premises 216, a user of mobile computing device 214 may transport mobile computing device 214 from user premises 216 to an additional user premises. While at the additional user premises, management facility 102 may facilitate sharing of the virtual STB key with one or more other media content processing devices located at the additional user premises. Mobile computing device 214 and/or the one or more other media content processing devices located at the additional user premises may, while located at the additional user premises, use the virtual STB key to leverage access rights of end-user account 212 to access media content.

Figure 9:
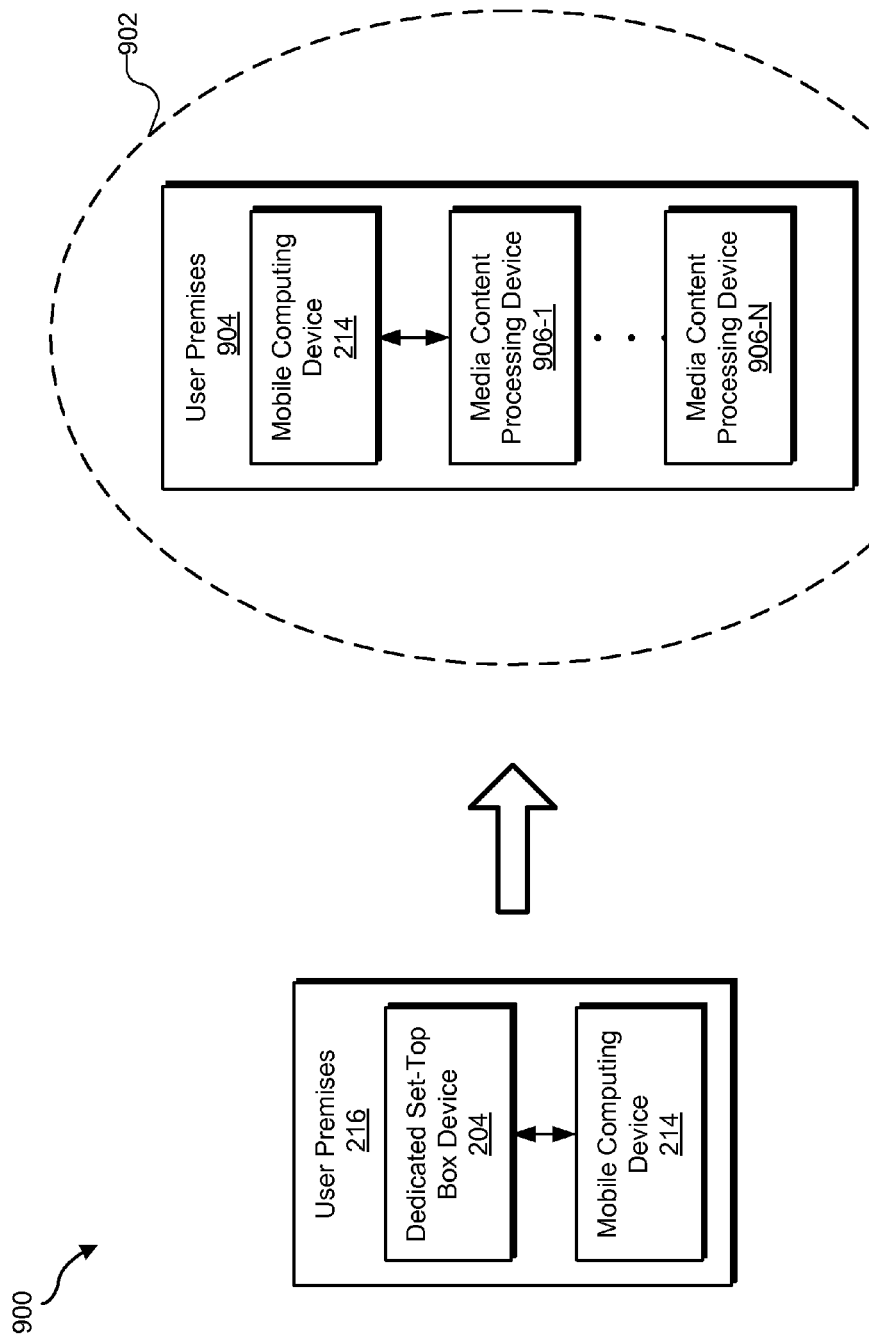

To illustrate, FIG. 9 shows an exemplary implementation 900 in which mobile computing device 214 is moved from user premises 216 to be within a predefined vicinity 902 associated with a different user premises 904. As shown in FIG. 9, user premises 904 may include mobile computing device 214 and media content processing devices 906 (e.g., media content processing devices 906-1 through 906-N). While mobile computing device 214 and one or more of media content processing device 906 are within predefined vicinity 902 of user premises 904, management facility 102 may facilitate sharing of the virtual STB key with one or more of media content processing devices 906. This may be accomplished in any suitable manner, such as described herein.

To illustrate an example, a user may be authorized to watch, through dedicated STB device 304 at user premises 216, a broadcast of a live sporting event based on the access rights of end-user account 212 (e.g., the user has subscribed to a particular sports channel package that includes the broadcast of the live sporting event). However, the user may want to watch the sporting event at a friend's house (e.g., user premises 904) because, for example, the friend has a larger television than the user. At the friend's house, however, there may not be conventional access to the media content distribution service (e.g., the friend's house is in a geographical area where the media content distribution service is not offered), or the friend may not subscribe to the media content distribution service. To facilitate watching the sporting event at the friend's house, the user may register mobile computing device 214 to operate as a virtual STB, such as described herein, while at user premises 216. The user may then take mobile computing device 214 to the friend's house and direct mobile computing device 214 to operate as a virtual STB device by sharing a virtual STB key with a media content processing device (e.g., the television or some other device connected to the television) at the friend's house. The media content processing device at the friend's house may then utilize the virtual STB key to access the broadcast of the live sporting event, in any suitable manner, from service provider system 202 by leveraging the access rights of end-user account 212.

In certain examples, management facility 102 may facilitate mobile computing device 214 operating as a virtual STB device only while mobile computing device 214 is within a vicinity of a predefined geographical location. To this end, in certain examples, the registration request may include data identifying a geographical location where the mobile computing device is authorized to operate as a virtual STB device. The geographical location may include any suitable area and may be defined in any suitable manner. In certain examples, the geographical location may correspond to a selected region or area such as a specific county or city. Alternatively, the geographical location may be defined as a limited area surrounding a specific location (e.g., an address, a house, a building, etc.).

Figure 10:
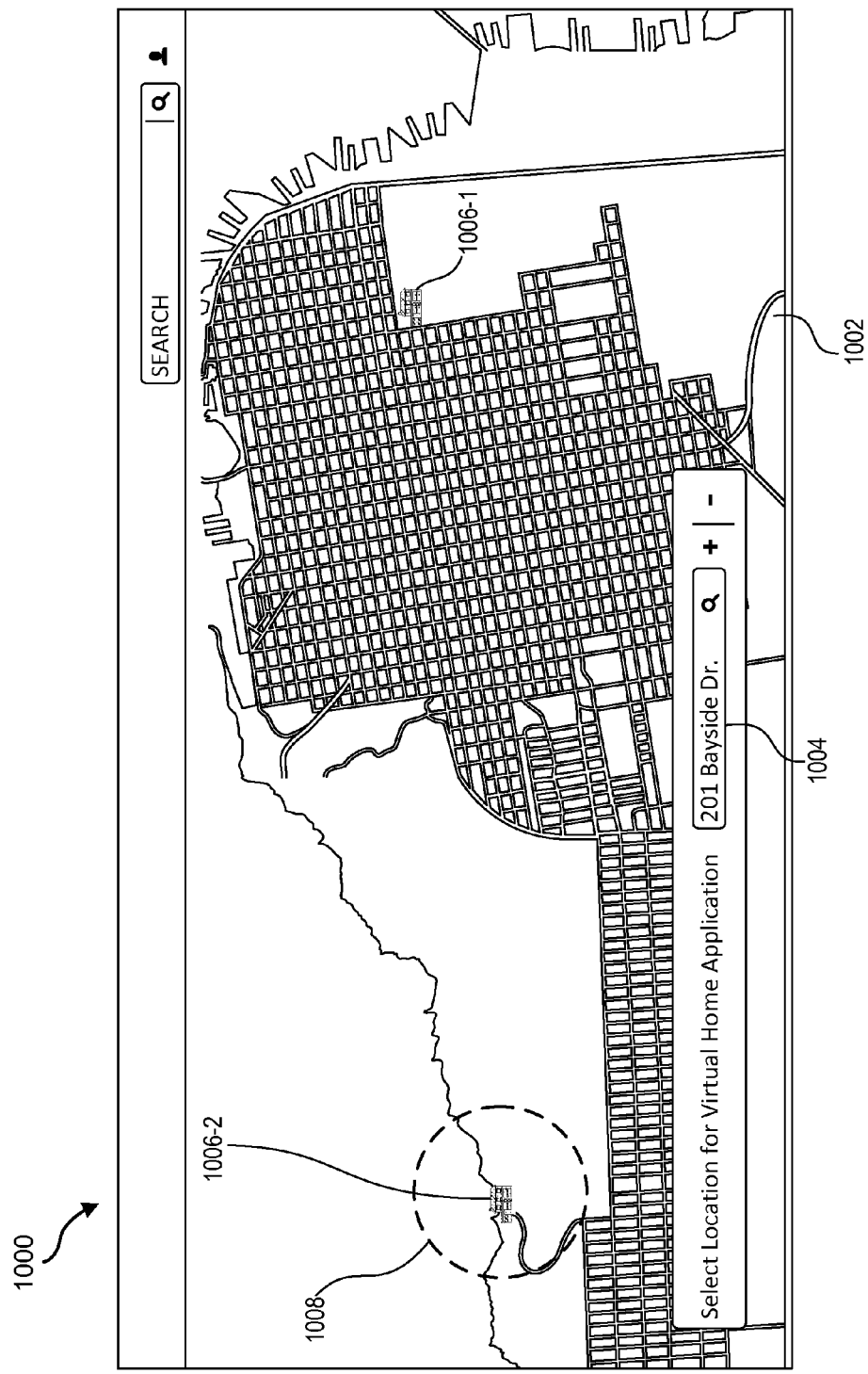
FIG. 10 illustrates an exemplary graphical user interface view according to principles described herein.

Management facility 102 may facilitate a user identifying the geographical location in any suitable manner. For example, management facility 102 may provide one or more graphical user interfaces that allow a user to specify the geographical location. To illustrate, FIG. 10 shows an exemplary graphical user interface 1000 that includes a map 1002 and a geographical location entry section 1004. In the example shown in FIG. 10, a user of a media content distribution service may own or otherwise be associated with a first residence 1006-1 (e.g., a primary home) located in an urban area. The user may also own or otherwise be associated with a second residence 1006-2 (e.g., a vacation home) located at a remote location. At first residence 1006-1, the user may be able to access media content provided by way of the media content distribution service through a dedicated STB device (e.g., dedicated STB device 204). However, second residence 1006-2 may be located in an area where the media content is not accessible through a dedicated STB device. By registering a mobile computing device (e.g., mobile computing device 214) to operate as a virtual STB device, such as described herein, the user may leverage access rights of an end-user account associated with first residence 1006-1 to access media content at second residence 1006-2. To this end, the user may enter, for example, an address of second residence 1006-2 in geographical location entry section 1004 to identify second residence 1006-2 as a geographical location where the mobile computing device will be authorized to operate as a virtual STB device.

After the user specifies the geographical location, the mobile computing device may transmit (e.g., in response to a user input) a registration request to a dedicated STB device that is communicatively coupled to the mobile computing device by way of a local area network at first residence 1006-1. The mobile computing device may then receive, in any suitable manner, a virtual STB key for use by the mobile computing device to operate as a virtual STB device at second residence 1006-2, while the virtual STB key is active, by leveraging the access rights of the end-user account associated with the dedicated STB device at first residence 1006-1. To utilize the mobile computing device as a virtual STB device, the user may then transport the mobile computing device from first residence 1006-1 to second residence 1006-2. While at second residence 1006-2, the mobile computing device may share the virtual STB key with a media content processing device located at second residence 1006-2 for use by the media content processing device to access, while the virtual STB key is active, the media content distributed by way of the media content distribution service.

In certain examples, management facility 102 may verify that the mobile computing device 214 is located at the authorized geographic location (e.g., second residence 1006-2) as a prerequisite to the virtual STB key being shared or otherwise used to access media content. If the location of the mobile computing device is verified to be at the authorized geographic location, management facility 102 may proceed to facilitate sharing of the virtual STB key. Otherwise, management facility 102 may prevent the virtual STB key from being shared or otherwise used to access media content. As a result, the user may be able to access the media content through the mobile computing device and/or a media content processing device while both the mobile computing device and media content processing device are within a predefined vicinity 1008 of second residence 1006-2 when the second residence 1006-2 is an authorized geographic location.

After a predetermined amount of time, the virtual STB key provided to the mobile computing device may become inactive (i.e., expire) such that the mobile computing device may no longer operate as a virtual STB device at second residence 1006-2. After the virtual STB key becomes inactive, the user may transport the mobile computing device back to first residence 1006-1 and repeat the process of registering the mobile computing device to operate as a virtual STB device. After the mobile computing device receives another virtual STB key during the re-registration process, the user may transport the mobile computing device to second residence 1006-2 and utilize the mobile computing device and/or a media content processing device to access media content again at second residence 1006-2.

The exemplary graphical user interface illustrated in FIG. 10 is provided for illustrative purposes only. It is understood that other graphical user interfaces may be provided in other implementations.

In certain examples, management facility 102 may limit a number of predefined geographical locations that may be tied to a particular end-user account of a media content distribution service. For example, management facility 102 may allow only two predefined geographical locations to be authorized at any given time. Fewer or more predefined geographical locations may be concurrently authorized in different implementations.

In certain examples, a mobile computing device (e.g., mobile computing device 214) may be indirectly associated with the user represented by end-user account 212. For example, the mobile computing device may be owned or operated by a friend or a family member of the user represented by end-user account 212. In such an implementation, management facility 102 may configure a mobile computing device of the friend or family member to operate as a virtual STB device such as described herein. The friend or family member of the user represented by end-user account 212 may then utilize the mobile computing device and/or one or more media content processing devices to leverage the access rights associated with end-user account 212 to access media content. In certain examples, management facility 102 may limit a number of mobile computing devices of friends or family members that may be configured to operate as virtual STB devices at a given time.

In certain examples, systems and methods described herein may allow a user of a media content processing device to share access rights to media content such that the user and one or more geographically distributed users may concurrently consume the media content during a virtual theater session. To illustrate, a user of a media content processing device may have access rights (e.g., through a subscription or a transaction) to access "Movie A," and the user may want to share those access rights with one or more friends that are located remotely (e.g., in a different city, state, etc.) from the user. To facilitate sharing the access rights, the user may utilize the media content processing device to interact with a service provider system to create a virtual theater session. For example, the user may define the virtual theater session as including presentation of Movie A at 7:00 PM on a particular night of the week. The user may also specify what friends he/she wants to invite to join the virtual theater session during the specified time. Based on the defined virtual theater session, the media content processing device may receive, from, for example, service provider system 202, a virtual theater key that is configured to be used to access the media content during the virtual theater session. The virtual theater key may have any suitable form, and may be received by the media content processing device in any suitable manner.

After the media content processing device receives the virtual theater key, the media content processing device may facilitate providing an invite to one or more other users (e.g., friends of the user) to concurrently watch Movie A during the virtual theater session. The invite may be provided in any suitable manner and may include any suitable information associated with the virtual theater session. For example, the invite may be provided through email, social media, etc. The invite may indicate the time of the virtual theater session, the media content (e.g., Movie A) to be consumed during the virtual theater session, and/or any other suitable information. The invite may include the virtual theater key that will allow the one or more other users to leverage the access rights of the user and access Movie A by way of one or more other media content processing devices during the virtual theater session. The media content processing devices may then use the virtual theater key, in any suitable manner, to access Movie A during the virtual theater session.

In certain examples, a number of users that may join the virtual theater session may be limited. For example, only a predefined number of users may consume the media content during the virtual theater session at a given time. Once the predefined number of users join the virtual theater session, additional users may be prevented from joining (e.g., indefinitely or until a corresponding number of users leave the virtual theater session).

Figure 11:
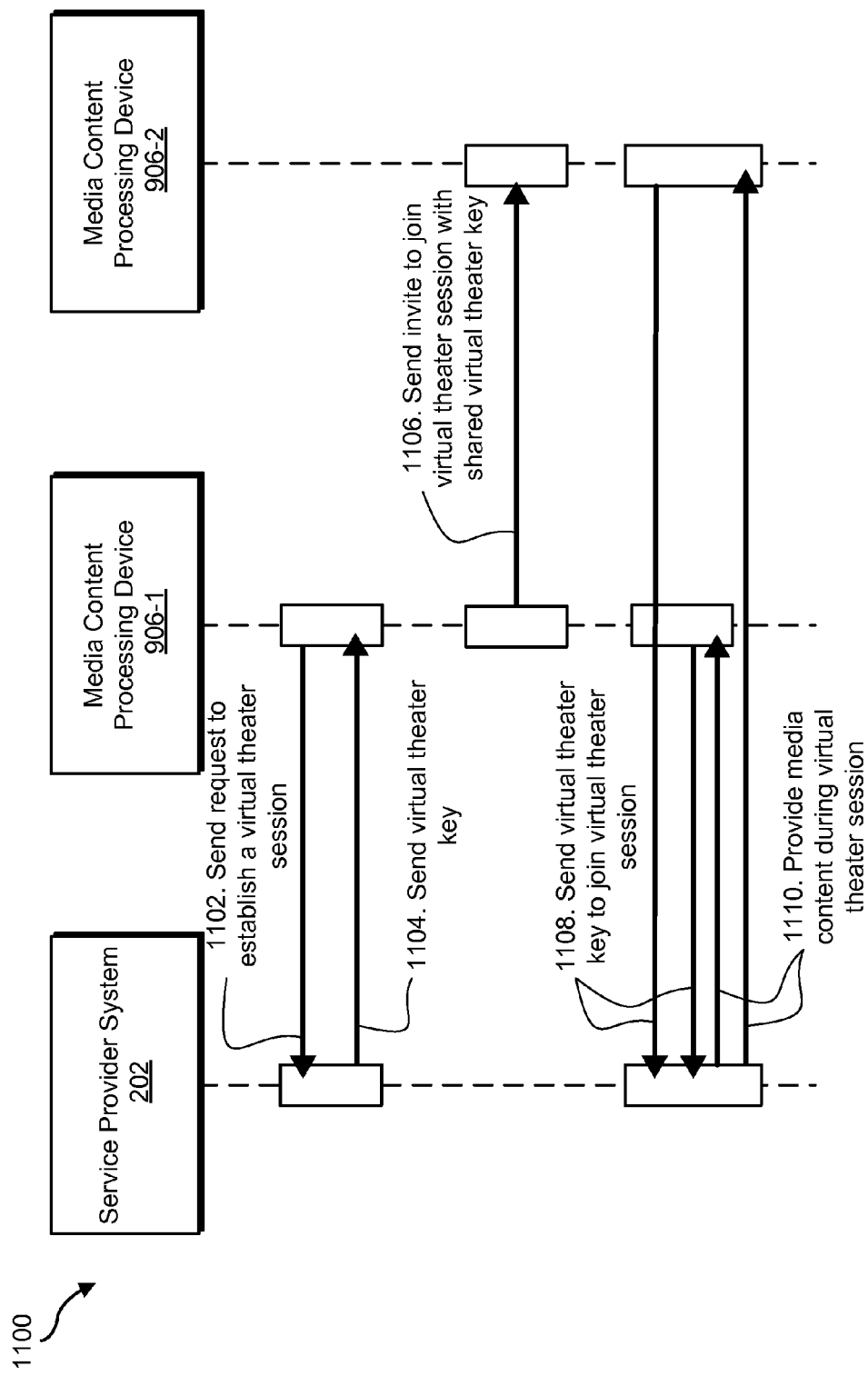
FIG. 11 illustrates another exemplary sequence diagram according to principles described herein.

To illustrate, FIG. 11 shows an exemplary sequence diagram 1100 showing communications that may be involved in establishing a virtual theater session. Arrow 1102 in FIG. 11 represents a request to establish a virtual theater session sent from a media content processing device 906-1 to service provider system 202. Arrow 1104 represents service provider system 202 sending a virtual theater key to media content processing device 906-1 in response to the request. The virtual theater key may be configured to be active only during a defined time period. Arrow 1106 represents media content processing device 906-1 sending an invite to join the virtual theater session to media content processing device 906-2. The invite represented by arrow 1106 may include a shared copy of the virtual theater key, which may be an encrypted copy of the virtual theater key, for use by media content processing device 906-2 to access the media content during the virtual theater session. Arrows 1108 represent media content processing devices 906-1 and 906-2 sending requests and the virtual theater key to service provider system 202 to access the media content during the virtual theater session. Arrows 1110 represent service provider system 202 concurrently providing media content to media content processing devices 906-1 and 906-2 during the virtual theater session.

The exemplary sequence diagram illustrated in FIG. 11 is provided for illustrative purposes only. It is understood that the requests and/or virtual theater key may be sent/received by different devices/systems in different implementations.

A virtual theater session may provide a way for a user to organize and invite other people to watch a media program within a particular time period. To illustrate one example, instead of purchasing a single-user license to access the media program, the user may purchase a theater license for a virtual theater session. The theater license may provide multiple licenses that may be used by multiple users within a defined time period, i.e., a virtual theater session. In this or a similar manner, the user may share a media program with others who are located remotely of the user.

Figure 12:
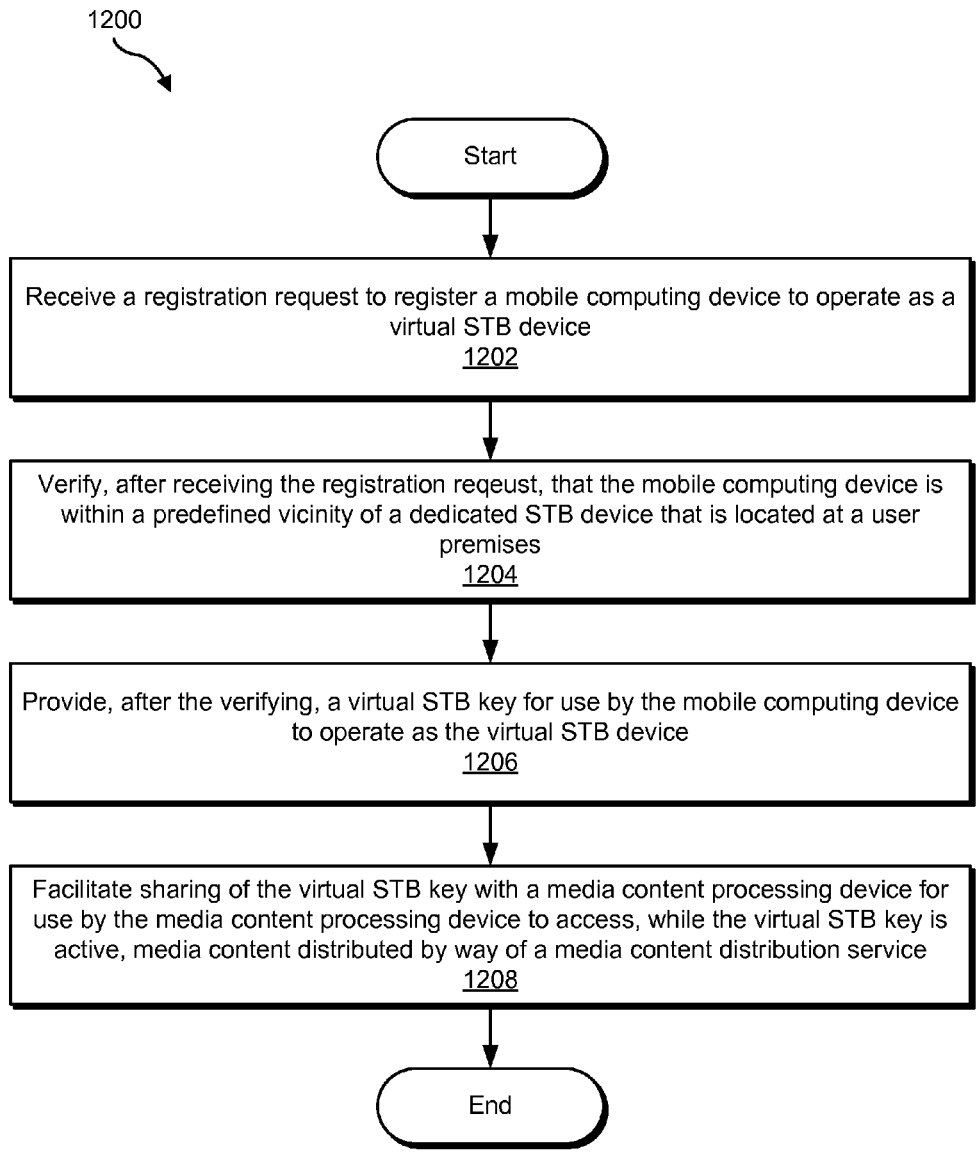
FIGS. 12-13 illustrate exemplary virtual set-top box device methods according to principles described herein.
Figure 13:
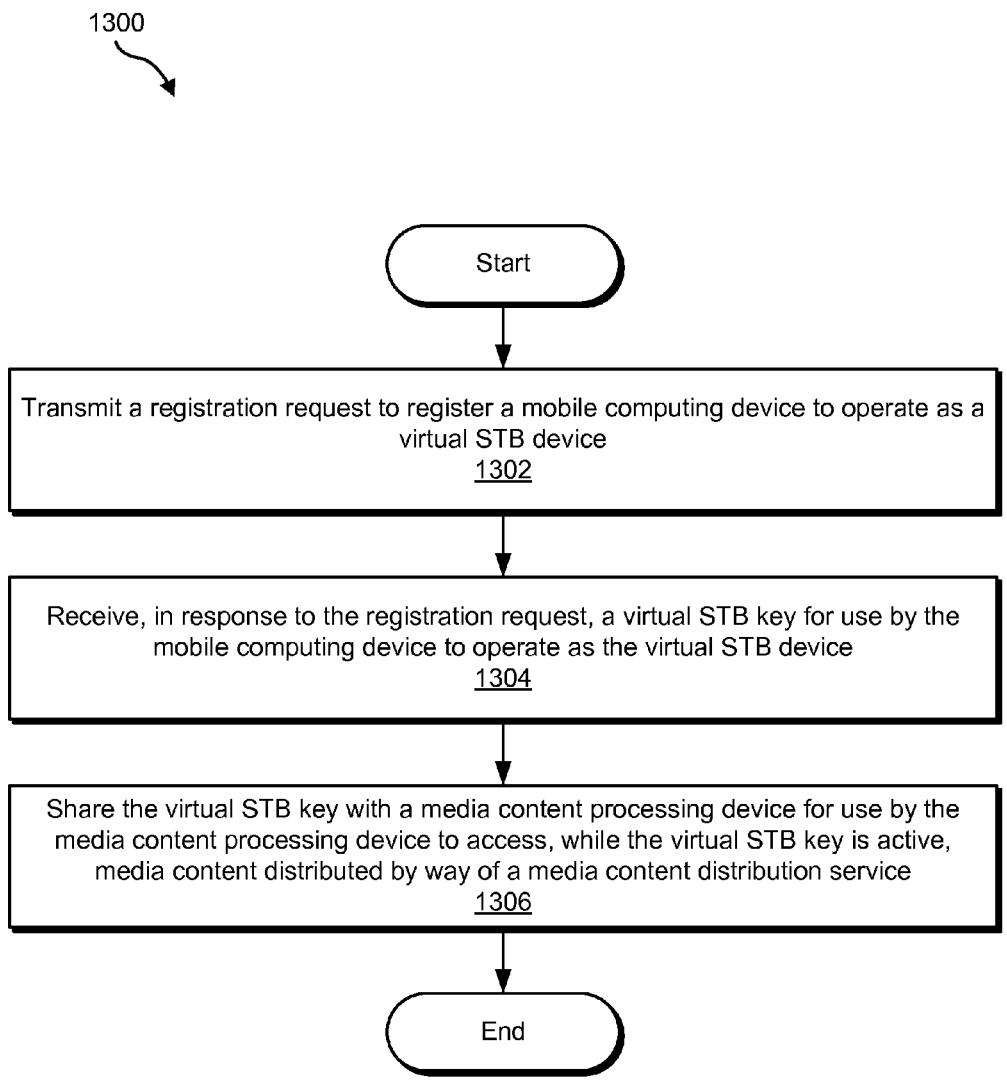

FIGS. 12-13 illustrate exemplary virtual set-top box device methods 1200-1300 according to principles described herein. While FIGS. 12-13 illustrate exemplary steps according to certain embodiments, other embodiments may omit, add to, reorder, combine, and/or modify any of the steps shown in FIGS. 12-13. In certain embodiments, one or more of the steps shown in FIGS. 12-13 may be performed by system 100 and/or one or more components or implementations of system 100.

Turning to method 1200 illustrated in FIG. 12, in step 1202, a system (e.g., system 100) may receive a registration request to register a mobile computing device to operate as a virtual STB device. Step 1202 may be performed in any of the ways described herein.

In step 1204, the system may verify, after receiving the registration request, that the mobile computing device is within a predefined vicinity of a dedicated STB device that is located at a user premises. As described herein, the dedicated STB device may be located at a user premises and may be configured to leverage access rights of an end-user account of a media content distribution service to access media content distributed by way of the media content distribution service. Step 1204 may be performed in any of the ways described herein.

In step 1206, the system may, after verifying that the mobile computing device is within a predefined vicinity of the dedicated STB device, provide a virtual STB key for use by the mobile computing device to operate as the virtual STB device. As described herein, while the virtual STB key is active, the mobile computing device may operate as the virtual STB device by leveraging the access rights of the end-user account of the media content distribution service to access media content distributed by way of the media content distribution service. Step 1206 may be performed in any of the ways described herein.

In step 1208, the system may facilitate sharing of the virtual STB key with a media content processing device for use by the media content processing device to access, while the virtual STB key is active, media content distributed by way of a media content distribution service. Step 1208 may be performed in any of the ways described herein.

Turning to method 1300 illustrated in FIG. 13, in step 1302, a mobile computing device (e.g., mobile computing device 214) may transmit a registration request to register the mobile computing device to operate as a virtual STB device. Step 1302 may be performed in any of the ways described herein.

In step 1304, the mobile computing device may receive, in response to the registration request, a virtual STB key for use by the mobile computing device to operate as the virtual STB device. Step 1304 may be performed in any of the ways described herein.

In step 1306, the mobile computing device may share the virtual STB key with a media content processing device for use by the media content processing device to access, while the virtual STB key is active, media content distributed by way of a media content distribution service. Step 1306 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 14:
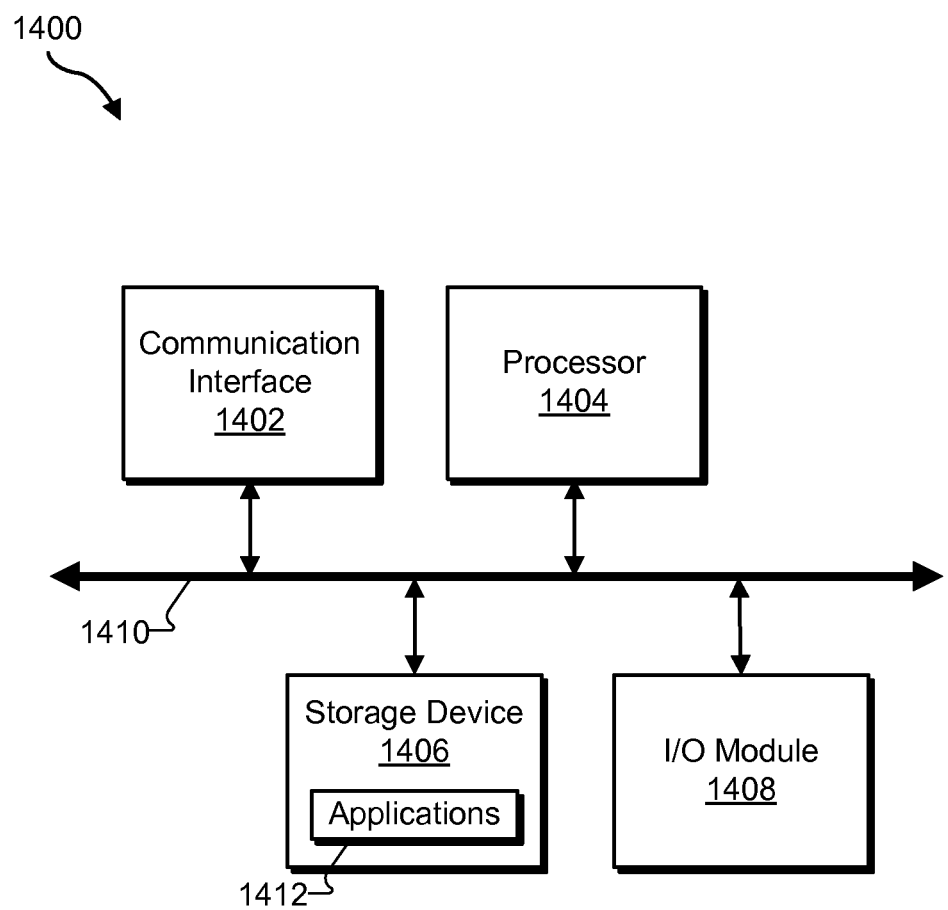
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output (I/O) module 1408 communicatively connected via a communication infrastructure 1410. While an exemplary computing device 1400 is shown in FIG. 14, the components illustrated in FIG. 14 are not intended to be limiting. Additional or alternative components and/or configurations of components may be used in other embodiments. For example, in addition or alternative to being communicatively connected by way of communication infrastructure 1410, one or more components of computing device 1400 may be communicatively connected by way of one or more other suitable interfaces. For instance, communication interface 1402, storage device 1406, I/O module 1408, and/or any other components of computing device 1400 may be communicatively coupled directly to processor 1404 via one or more interfaces (e.g., discrete interfaces). Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. In at least one embodiment, communication interface 1402 may provide a direct connection between system 100 and one or more of provisioning systems via a direct link to a network, such as the Internet. Communication interface 1402 may additionally or alternatively provide such a connection through, for example, a local area network (such as an Ethernet network), a personal area network, a telephone or cable network, a satellite data connection, a dedicated URL, or any other suitable connection. Communication interface 1402 may be configured to interface with any suitable communication media, protocols, and formats, including any of those mentioned above.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1400. For example, one or more applications 1412 residing within storage device 1406 may be configured to direct processor 1404 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

To the extent the aforementioned embodiments may modify media programs and/or provide alternative ways for users to access and/or consume media programs, it should be understood that such operations shall be used in accordance with all applicable laws and/or agreements concerning protection of media programs and the rights of owners and/or distributors of media programs. One or more of the operations described herein may be subject to the consent and/or agreement of one or more entities, such as owners and/or distributors of media programs.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
   receiving, by a virtual set-top box ("STB") device system, a registration request to register a mobile computing device to operate as a virtual STB device;
   verifying, by the virtual STB device system after the receiving of the registration request, that the mobile computing device is within a predefined vicinity of a dedicated STB device that is located at a user premises and that is configured to leverage access rights of an end-user account of a media content distribution service to access media content distributed by way of the media content distribution service;
   providing, by the virtual STB device system to the mobile computing device after the verifying, a virtual STB key for use by the mobile computing device to operate as the virtual STB device, while the virtual STB key is active, by leveraging the access rights of the end-user account of the media content distribution service to access the media content distributed by way of the media content distribution service; and
   facilitating, by the virtual STB device system, sharing of the virtual STB key with a media content processing device that is located at a geographical location that is remote from the user premises for use by the media content processing device to access, while the virtual STB key is active and directly from a server of the media content distribution service that is located remotely from the user premises, the media content distributed by way of the media content distribution service,
   wherein the media content is accessible by the media content processing device at the geographical location that is remote from the user premises only while the virtual STB key is active and the media content processing device is communicatively connected to the mobile computing device by a local area network at the geographical location that is remote from the user premises.

2. The method of claim 1, wherein the verifying that the mobile computing device is within the predefined vicinity of the dedicated STB device includes determining that the mobile computing device is communicatively connected to the dedicated STB device by way of a local area network at the user premises.

3. The method of claim 1, further comprising verifying, by the virtual STB device system prior to the facilitating of the sharing of the virtual STB key with the media content processing device, that the media content processing device is within a predefined vicinity of the mobile computing device.

4. The method of claim 1, wherein the facilitating of the sharing of the virtual STB key with the media content processing device includes directing the mobile computing device to transmit an encrypted copy of the virtual STB key to the media content processing device.

5. The method of claim 1, wherein:
   the registration request includes data identifying the geographical location as a location where the mobile computing device is authorized to operate as the virtual STB device; and
   the method further comprises verifying, by the virtual STB device system, that the mobile computing device is within a predefined vicinity of the geographical location as a prerequisite to the mobile computing device accessing the media content.

6. The method of claim 5, wherein the mobile computing device is authorized to access the media content only while the mobile computing device is within the predefined vicinity of the geographical location identified in the registration request.

7. The method of claim 1, wherein the virtual STB key is set to become inactive after a predetermined amount of time.

8. The method of claim 1, embodied as a non-transitory computer-readable medium with encoded computer-executable instructions which, when executed by a processor of the virtual STB device system, cause the method to be performed.

9. A method comprising:
   transmitting, by a mobile computing device to a dedicated set-top box ("STB") device that is communicatively coupled to the mobile computing device by way of a local area network at a user premises and that is registered with an end-user account of a media content distribution service to leverage access rights of the end-user account of the media content distribution service to access media content distributed by way of the media content distribution service, a registration request to register the mobile computing device to operate as a virtual STB device;

receiving, by the mobile computing device in response to the registration request, a virtual STB key for use by the mobile computing device to operate as the virtual STB device, while the virtual STB key is active, by leveraging the access rights of the end-user account of the media content distribution service to access the media content distributed by way of the media content distribution service; and sharing, by the mobile computing device, the virtual STB key with a media content processing device that is located at a geographical location that is remote from the user premises for use by the media content processing device to access, while the virtual STB key is active and directly from a server of the media content distribution service that is located remotely from the user premises, the media content distributed by way of the media content distribution service, wherein the media content is accessible by the media content processing device at the geographical location that is remote from the user premises only while the virtual STB key is active and the media content processing device is communicatively connected to the mobile computing device by a local area network at the geographical location that is remote from the user premises.

10. The method of claim 9, further comprising:

receiving, by the mobile computing device, a media content access request from the media content processing device, the media content access request including the virtual STB key;

providing, by the mobile computing device, the media content access request and the included virtual STB key to a service provider system to verify that the virtual STB key is active;

receiving, by the mobile computing device from the service provider system, verification that the virtual STB key is active; and facilitating, by the mobile computing device after receiving the verification, access to the media content by the media content processing device.

11. The method of claim 9, further comprising verifying, by the mobile computing device prior to the sharing of the virtual STB key with the media content processing device, that the media content processing device is within a predefined vicinity of the mobile computing device.

12. The method of claim 9, wherein the sharing of the virtual STB key with the media content processing device includes the mobile computing device transmitting an encrypted copy of the virtual STB key to the media content processing device.

13. The method of claim 9, wherein the virtual STB key is set to become inactive after a predetermined amount of time.

14. The method of claim 9, embodied as a non-transitory computer-readable medium with encoded computer-executable instructions which, when executed by a processor of the mobile computing device, cause the method to be performed.

15. A system comprising:
at least one physical computing device that:
receives a registration request to register a mobile computing device to operate as a virtual STB device;
verifies, after the receiving of the registration request, that the mobile computing device is within a predefined vicinity of a dedicated STB device that is located at a user premises and that is configured to leverage access rights of an end-user account of a media content distribution service to access media content distributed by way of the media content distribution service;
provides, to the mobile computing device after the verifying, a virtual STB key for use by the mobile computing device to operate as the virtual STB device, while the virtual STB key is active, by leveraging the access rights of the end-user account of the media content distribution service to access the media content distributed by way of the media content distribution service; and
facilities sharing of the virtual STB key with a media content processing device that is located at a geographical location that is remote from the user premises for use by the media content processing device to access, while the virtual STB key is active and directly from a server of the media content distribution service that is located remotely from the user premises, the media content distributed by way of the media content distribution service,
wherein the media content is accessible by the media content processing device at the geographical location that is remote from the user premises only while the virtual STB key is active and the media content processing device is communicatively connected to the mobile computing device by a local area network at the geographical location that is remote from the user premises.

16. The system of claim 15, wherein:
the registration request includes data identifying the geographical location as a location where the mobile computing device is authorized to operate as the virtual STB device; and
the at least one physical computer device further verifies that the mobile computing device is within a predefined vicinity of the geographical location as a prerequisite to the mobile computing device accessing the media content.

17. The system of claim 16, wherein the mobile computing device is further authorized to access the media content only while the mobile computing device is within the predefined vicinity of the geographical location identified in the registration request.

18. The system of claim 15, wherein the at least one physical computing device further verifies, prior to the facilitating of the sharing of the virtual STB key with the media content processing device, that the media content processing device is within a predefined vicinity of the mobile computing device.

* * * * *